United States Patent
Chan et al.

(10) Patent No.: US 10,231,126 B2
(45) Date of Patent: Mar. 12, 2019

(54) SYSTEM AND METHOD FOR ENTERPRISE SECURITY THROUGH P2P CONNECTION

(71) Applicant: GPVTL Canada Inc., Mississauga (CA)

(72) Inventors: Boris Kai-Tik Chan, Toronto (CA); Allan Baril, Toronto (CA)

(73) Assignee: GPVTL Canada Inc., Mississauga (CA)

(*) Notice: Subject to any disclaimer, the term of this patent is extended or adjusted under 35 U.S.C. 154(b) by 98 days.

(21) Appl. No.: 14/096,691

(22) Filed: Dec. 4, 2013

(65) Prior Publication Data

US 2014/0165158 A1    Jun. 12, 2014

Related U.S. Application Data

(60) Provisional application No. 61/797,383, filed on Dec. 6, 2012.

(51) Int. Cl.
*H04L 29/06* (2006.01)
*H04W 12/08* (2009.01)
*H04W 12/04* (2009.01)

(52) U.S. Cl.
CPC ............. *H04W 12/08* (2013.01); *H04L 63/10* (2013.01); *H04W 12/04* (2013.01)

(58) Field of Classification Search
CPC ..... H04W 12/04; H04W 12/08; H04W 12/06; H04W 12/12; H04L 63/10; H04L 63/107–63/108; H04L 63/083
See application file for complete search history.

(56) References Cited

U.S. PATENT DOCUMENTS

| | | | |
|---|---|---|---|
| 2004/0049737 A1 | 3/2004 | Hunt et al. | |
| 2008/0046574 A1 | 2/2008 | Kinoshita et al. | |
| 2009/0003603 A1 | 1/2009 | Wessel et al. | |
| 2009/0113298 A1 | 4/2009 | Jung et al. | |
| 2010/0077058 A1 | 3/2010 | Messer | |
| 2011/0107234 A1 | 5/2011 | Lee et al. | |
| 2011/0173265 A1 | 7/2011 | Liang et al. | |
| 2011/0227788 A1* | 9/2011 | Lundgren | G01S 19/49 342/357.28 |
| 2012/0036494 A1 | 2/2012 | Gurumohan et al. | |
| 2012/0096366 A1 | 4/2012 | Narla et al. | |

(Continued)

OTHER PUBLICATIONS

Menezes et al., Handbook of Applied Cryptography, CRC Press, 1997, pp. 397-405.*

(Continued)

*Primary Examiner* — Minh Dinh
(74) *Attorney, Agent, or Firm* — Mahamedi IP Law LLP (57) ABSTRACT

A method is provided for permitting access to enterprise resources mediated between a first peer device and a second peer device. A shared detection application is installed on both devices. When a second peer device requests access to enterprise resources, the first peer device detects if the devices are within a certain preset distance of each other. The second peer device is permitted to access the enterprise resources while the devices remain within the preset distance of each other. Access is shut-down after a pre-determined time if the first device and the second device are no longer within the preset distance of each other.

19 Claims, 3 Drawing Sheets

(56) References Cited

U.S. PATENT DOCUMENTS

2013/0091537 A1* 4/2013 Parla ................. G06F 21/00
                                                              726/1
2013/0097327 A1   4/2013 Preiss et al.
2014/0195977 A1   7/2014 Chang et al.

OTHER PUBLICATIONS

Simple Pairing Whitepaper, Bluetooth, 2006.*
Bluetooth User Interface Flow Diagrams for Bluetooth Secure Simple Pairing Devices, Bluetooth, 2007.*
Specification of the Bluetooth System, Version 4.0, vol. 1, 2010, pp. 93-97.*

* cited by examiner

SYSTEM AND METHOD FOR ENTERPRISE SECURITY THROUGH P2P CONNECTION

CROSS-REFERENCE TO RELATED APPLICATION

This application claims priority to U.S. patent application Ser. No. 61/797,383 for System and Method for Enterprise Security Through P2P Connection, filed Dec. 6, 2012, the disclosure of which in hereby incorporated by reference in its entirety.

FIELD OF INVENTION

The field of invention is generally related to mobile devices like Smartphones and in particular to improved enterprise security using peer-to-peer technology preferably Bluetooth or Near Field Communications (NFC).

BACKGROUND

Mobile devices have become an essential and inseparable part of the lifestyle. People use these devices for personal communications as well as for office communications, often carrying two or more separate devices e.g. a Smartphone and a tablet. Existing mobile devices e.g. phones, Smartphones, tablets and the like, have a multitude of functions that provide connectivity and communications services to a user. These devices are becoming increasingly smaller and more powerful and are used for making phone calls, checking e-mail, getting directions, playing games, searching the web, searching for places of interest on a map, among a host of other things.

Devices, mobile or otherwise, are often lost or stolen, and may provide an opportunity for someone who is not privileged to access the enterprise network to do so. Additionally any device left unattended for a duration (even if it is not lost) creates a security problem as it may provide an opportunity for an unauthorized person to access files, data and other information deemed private that is either on this device or accessible through this device.

Thus we note that there is need for an enterprise security method that overcomes these limitations of the prior art.

SUMMARY

A secure method of access to enterprise resources is provided using a P2P connection between two devices such that proximity between a first device and a second device is required in order for the second device to be able to access enterprise resources.

The preferred embodiment of the invention provides a method whereby an application may be installed on a first and second devices, such that the application provides a mechanism via a P2P technology like Bluetooth or Near Field Communications (NFC) for locking the second device whenever the first device moves out of a certain range. Thus the privileges of the second device are suspended when it loses connection with the first device.

In an alternate or complimentary embodiment of the invention the location of the user vis-a-vis the first and second devices may also play a role in determining the time-out window of how soon after losing connection with the first device, the second device must lock itself up. Therefore as an example, if the user is in the office the time-out window may be larger since it is a trusted environment, but when in a public place like a cafe this time-out window may be rather short to avoid or mitigate the possibility of any unauthorized use.

The system and method thus offer improved enterprise security.

According to a first aspect of the invention, a method is provided for permitting access to enterprise resources that is mediated between a first peer device and a second peer device. A detection application is installed on both devices. Upon a second peer device requesting access to enterprise resources, a first peer device detects if the second peer device is within a preset distance of the first peer device. If the devices are within the preset distance of each other, the first peer device permits access by the second peer device to the enterprise resources. The detection application monitors that the first peer device and the second peer device are within the preset distance of each other. The access is shut-down after a pre-determined time if the first device and the second device are no longer within the preset distance of each other. (The access shut-down may involve shutting down or suspending access to the enterprise resources, or shutting down the second device altogether.)

The first and second devices may need to go through a preliminary pairing step. In this step, the first peer device discovers nearby devices through the detection application. The second peer device is selected from among the nearby devices. The devices are paired after an exchange of a security protocol. For example, the security protocol may comprise a challenge and response exchange between the first peer device and the second peer device using a hashed timestamp or nonce.

Preferably, the discovering step uses a P2P network selected from the group consisting of: Bluetooth, NFC, and WiFi.

Preferably, the nearby devices are displayed on a list or menu on the detection application. The nearby devices can be selected from the list or menu. Preferably, each of the nearby devices is displayed with a unique identifier.

While the access is permitted, the enterprise resources are accessible by the second peer device directly. The second peer device accesses the resources from a corporate network (e.g. an enterprise server) without passing through the first peer device. Preferably, the first peer device and the second peer device do not see or know about each other's communications with the enterprise server.

The length of the pre-determined time (for time-out or shut-down) may be governed by various factors (e.g. user preference or by corporate policy). In one embodiment, the length of the pre-determined time may depend on a location of the second peer device. For example, the location may be detected based on: at least one location sensor in communication with the second peer device (e.g. GPS receiver, WiFi, and/or altimeter); or a user input received on the second peer device. A location in a public or unsecure place may result in a relatively shorter pre-determined time than a location in a private or secure place. A location in an office or place of business of a user of the second peer device may result in a relatively longer pre-determined time than any other location. Where an altimeter is used, the shut-down time may depend on which floor of a building the device is located.

In a preferred embodiment, at least one of the first peer device and the second peer device is a mobile device.

DETAILED DESCRIPTION

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in details, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. LAMP (Linux, Apache, MySQL and PHP) is an example of a well-known opensource Web development platform. Other examples of environments and frameworks using which computer code may also be generated are Ruby on Rails which is based on the Ruby programming language, or node.js which is an eventdriven server-side JavaScript environment.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A device that enables a user to engage with an application using the invention, including a memory for storing a control program and data, and a processor (CPU) for executing the control program and for managing the data, which includes user data resident in the memory and includes buffered content. The computer may be coupled to a video display such as a television, monitor, or other type of visual display while other devices may have it incorporated in them (iPad). An application or a game or other simulation may be stored on a storage media such as a DVD, a CD, flash memory, USB memory or other type of memory media or it may be downloaded from the internet. The storage media can be inserted to the console where it is read. The console can then read program instructions stored on the storage media and present a user interface to the user.

Figure 1:
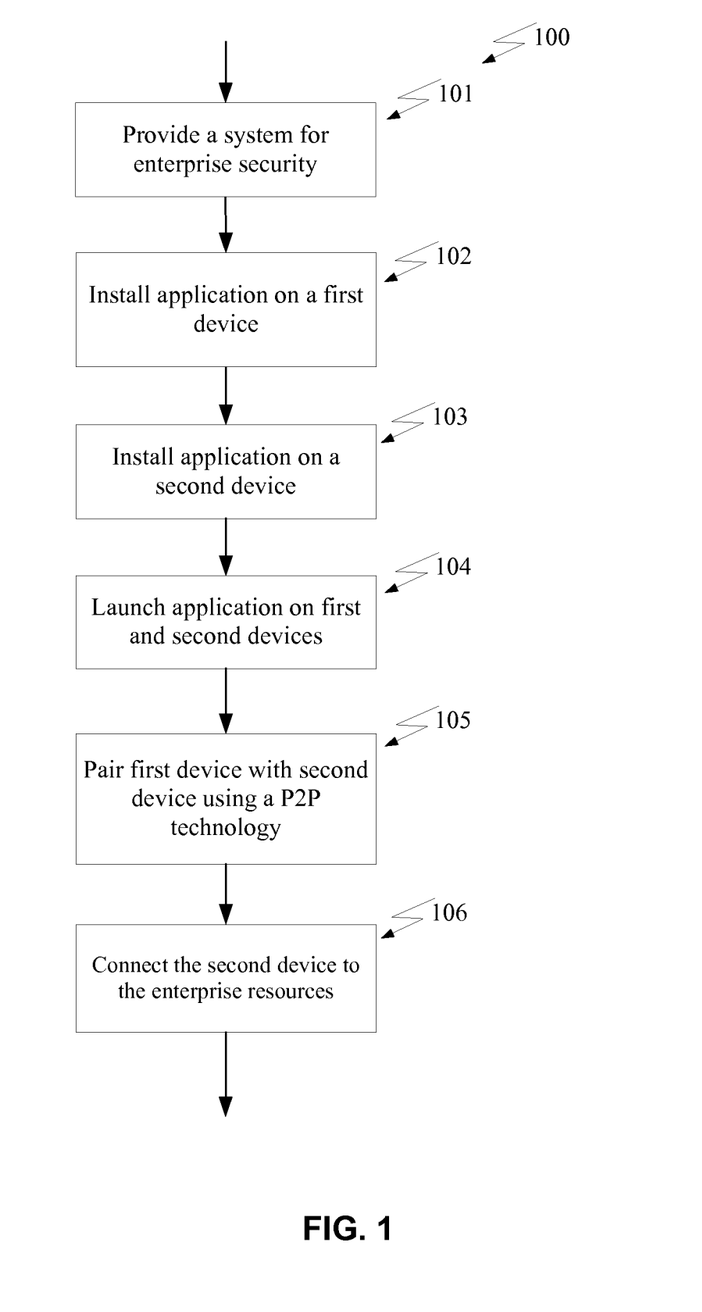
FIG. 1 is a flow diagram illustrating the primary steps of the method of permitting access to enterprise resources as mediated between a first peer device and a second peer device, according to a preferred embodiment.

FIG. 1 is a flow diagram illustrating the primary steps of the method of permitting access to enterprise resources as mediated between a first peer device and a second peer device, according to a preferred embodiment. According to the method, a system is provided for secure file sharing on mobile devices 101. In a preferred embodiment, the system and method may be implemented on a mobile device like a Smartphone, a tablet, a computer or the like. Devices where invention can be advantageously implemented may include but not limited to an iPhone, iPad, Smartphones, Android phones, personal computers e.g. laptops, tablet computers, touch-screen computers running any number of different operating systems e.g. MS Windows, Apple iOS, Linux, Ubuntu, etc. or any other device where a P2P connection can be supported using any of the various P2P technologies like Bluetooth, NFC etc.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

The application is installed on a first device 102. The application may have more than one version, where each particular version is intended for a particular operating system. For example there may be a version of the application for iOS that can be installed on iPhone and iPad, while there is another version of the application that can be installed on an Android device.

The application is also installed on a second device 103. The first device and the second device may have the same operating system e.g. the first device is an iPhone while the second device is an iPad or the first device and the second device may have different operating systems e.g. the first device is an Android phone while the second device is a laptop running Microsoft Windows 7.

The application is then launched (not necessarily concurrently) on the first and second devices 104. Once the applications are launched on the respective devices, they call the embedded P2P technology in the device e.g. Bluetooth chipset using the requisite APIs that are provided in the operating systems for so doing.

The first and the second devices are paired using a P2P technology e.g. Bluetooth 105. The nearby devices may be listed in a drop down menu or a list with selection radio buttons or any other user friendly method that is widely used on devices especially ones with touch screens.

The second device is connected to the enterprise resources 106. Once the first device and the second device are paired using the P2P technology the second device is allowed to access the enterprise resources.

A peer-to-peer, commonly abbreviated to P2P, is any distributed network architecture composed of participants that make a portion of their resources (such as processing power, disk storage or network bandwidth) directly available to other network participants, without the need for central coordination instances (such as servers or stable hosts). Peer-to-peer networks are typically formed dynamically by ad-hoc additions of nodes. Peers are both suppliers and consumers of resources, in contrast to the traditional client-server model where only servers supply, and clients consume.

Peer-to-peer systems often implement an Application Layer overlay network on top of the native or physical network topology. Such overlays are used for indexing and peer discovery. Content is typically exchanged directly over the underlying Internet Protocol (IP) network. Anonymous peer-to-peer systems are an exception, and implement extra routing layers to obscure the identity of the source or destination of queries.

A P2P computer network is one in which each computer in the network can act as a client or server for the other computers in the network, allowing shared access to various resources such as files, peripherals, and sensors without the need for a central server. P2P networks can be set up within the home, a business, or over the Internet. Each network type requires all computers in the network to use the same or a compatible program to connect to each other and access files and other resources found on the other computer. P2P networks can be used for sharing content such as audio, video, data, or anything in digital format.

P2P is a distributed application architecture that partitions tasks or workloads among peers. Peers are equally privileged participants in the application. Each computer in the network is referred to as a node. P2P networks are typically used for connecting nodes via largely ad hoc connections. Sharing content files containing audio, video, data or anything in digital format is very common, and real time data, such as telephony traffic, is also passed using P2P technology.

This model of network arrangement differs from the client-server model where communication is usually to and from a central server. A typical example of a file transfer that does not use the P2P model is the File Transfer Protocol (FTP) service in which the client and server programs are distinct: the clients initiate the transfer, and the servers satisfy these requests.

A pure P2P network does not have the notion of clients or servers but only equal peer nodes that simultaneously function as both "clients" and "servers" to the other nodes on the network. This model of network arrangement differs from the client-server model where communication is usually to and from a central server.

The P2P overlay network consists of all the participating peers as network nodes. There are links between any two nodes that know each other: i.e. if a participating peer knows the location of another peer in the P2P network, then there is a directed edge from the former node to the latter in the overlay network. Based on how the nodes in the overlay network are linked to each other, we can classify the P2P networks as unstructured or structured.

In structured P2P networks, peers are organized following specific criteria and algorithms, which lead to overlays with specific topologies and properties. Structured P2P systems are appropriate for large-scale implementations due to high scalability and some guarantees on performance. In structured peer-to-peer networks, connections in the overlay are fixed. They typically use distributed hash table-based (DHT) indexing.

Unstructured P2P networks do not impose any structure on the overlay networks. Peers in these networks connect in an ad-hoc fashion based on some loose set of rules. Ideally, unstructured P2P systems would have absolutely no centralized elements/nodes, but in practice there are several types of unstructured systems with various degrees of centralization. In an 'ad-hoc' network, the removal of nodes has no significant impact on the network. The distributed architecture of an application in a peer-to-peer system provides enhanced scalability and service robustness.

Unstructured peer-to-peer networks do not provide any algorithm for organization or optimization of network connections. In particular, three models of unstructured architecture are defined. In pure peer-to-peer systems the entire network consists solely of equipment peers. There is only one routing layer, as there are no preferred nodes with any special infrastructure function. Hybrid peer-to-peer systems allow such infrastructure nodes to exist, often called supernodes. In centralized peer-to-peer systems, a central server is used for indexing functions and to bootstrap the entire system. Although this has similarities with a structured architecture, the connections between peers are not determined by any algorithm. The first prominent and popular peer-to-peer file sharing system, Napster, was an example of the centralized model. Gnutella and Freenet, on the other hand, are examples of the decentralized model. Kazaa is an example of the hybrid model.

Bluetooth is a technology standard for exchanging data over short distances (using short-wavelength radio transmissions) from fixed and mobile devices, creating personal area networks (PANs) with high levels of security. Bluetooth can connect several devices, overcoming problems of synchronization. Bluetooth is a standard wire-replacement communications protocol primarily designed for low power consumption, with a short range. Because the devices use a radio (broadcast) communications system, they do not have to be in visual line of sight of each other.

A master Bluetooth device can communicate with a maximum of seven devices in a piconet (an ad-hoc computer network using Bluetooth technology), though not all devices reach this maximum. The devices can switch roles, by agreement, and the slave can become the master.

At any given time, data can be transferred between the master and one other device (except for the less-used broadcast mode). The master chooses which slave device to address; typically, it switches rapidly from one device to another in a round-robin fashion.

Any Bluetooth device in discoverable mode will transmit the following information on demand:
Device name
Device class
List of services
Technical information (for example: device features, manufacturer, Bluetooth specification used, clock offset)

Any device may perform an inquiry to find other devices to connect to, and any device can be configured to respond to such inquiries. However, if the device trying to connect knows the address of the device, it always responds to direct connection requests and transmits the information shown in the list above if requested. Use of a device's services may require pairing or acceptance by its owner, but the connection itself can be initiated by any device and held until it goes out of range. Some devices can be connected to only one device at a time, and connecting to them prevents them from connecting to other devices and appearing in inquiries until they disconnect from the other device.

Every device has a unique 48-bit address. However, these addresses are generally not shown in inquiries. Instead, friendly Bluetooth names are used, which can be set by the user. This name appears when another user scans for devices and in lists of paired devices. By default most phones have the Bluetooth name set to the manufacturer and model of the phone.

Figure 2:
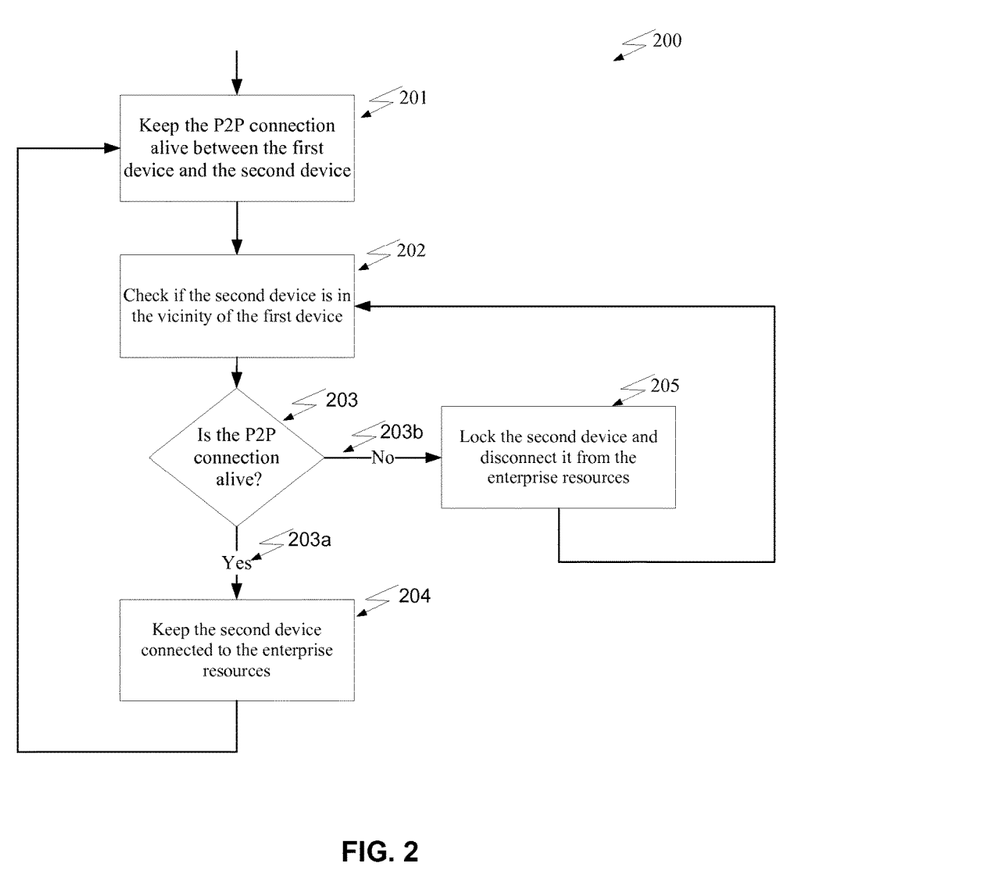
FIG. 2 is a flow diagram further illustrating the continuous monitoring portion of the method.

FIG. 2 is a flow diagram further illustrating the continuous monitoring portion of the method. FIG. 2 shows one embodiment of the invention. The P2P connection is kept alive between the first device and the second device 201. For example, the connection may be kept alive by the application installed on the first device periodically pinging the second device over the P2P network.

The application queries the vicinity using a P2P communications technology e.g. Bluetooth or Near Field Communications (NFC), WiFi or other such technology 202. For this disclosure we use Bluetooth as the preferred technology of embodiment. It is to be understood that this is for exemplary purposes and is not limiting. In fact any P2P communications technology that can achieve this purpose can be used.

The system checks whether the second device is in the vicinity of the first device 203. For example, this may be achieved by having the application of the invention installed on a first device ping the application installed on a second device over the Bluetooth connection.

If the P2P (Bluetooth) connection is still alive (Yes 203a), then the system keeps the second device connected to the enterprise resources 204. The Bluetooth connection is kept alive if a response to the ping sent by the first device receives a response from the second device within a defined window of time. This loop continues as long as the application is not closed.

In one preferred embodiment, the first device (e.g. an iPhone) and a second device (e.g. an iPad) periodically communicate (over Bluetooth) using a challenge/response protocol. For example, the iPad may periodically send a nonce to the iPhone. The iPhone would hash said nonce along with a shared password, returning the hash. The iPad would then confirm the hash matches that it would generate based on the shared password and the original nonce. If either values don't match or communication stops the iPad would go to a lock screen to prevent access.

If the P2P (Bluetooth) connection is not alive (No 203b), then the system locks the second device and/or disconnects it from the enterprise resources 205. The Bluetooth connection is dropped if a response to the ping sent by the first device does not receives a response from the second device within a defined window of time.

The Bluetooth API on the implementation platforms may be leveraged for this purpose. The challenge/response protocol is well understood in the field of cryptography and may use any one of the several APIs that may be available on the implementation platforms which could be leveraged to perform the hashing/encryption.

Other P2P technologies may be used, such as Near Field Communications (NFC).

In one embodiment, both timestamp and nonce may be used as ways to prevent a "man in the middle" attack on an authentication mechanism and are well understood in the prior art. They work slightly differently, but the intent is the same—to provide a piece of data that is cryptographically built into the authentication mechanism that would make it difficult or impossible for an attacker to attack the system by replaying the message. A typical mechanism is authentication via digital signature. In either case, the authorization mechanism includes the following steps:
1—Create a message and attach timestamp or nonce to the message
2—Hash both the message and the timestamp or nonce
3—Encrypt the hash with the private key (i.e. digitally sign it)
4—Send signature and the message and nonce/timestamp
5—Recipient gets the encrypted message
6—Recipient checks that the signature matches the sent data (repeat step 2, decrypt signature with public key, compare to hash)
7—Recipient checks timestamp or nonce:
   a—Check timestamp—the value of the timestamp must be within an acceptable range of the current time.
   b—Check nonce—verify that the nonce that was received has never before been received from this sender. Since the hash is unique to the contents of the message, this message must have come from the authorized sender, because this message is not being replayed.
8—Recipient performs any further authorization and access control checks.

Either the timestamp or the nonce must be part of the signature. The use of a timestamp may be preferred, as many messages may be sent in a current spectrum of time. For example, if the timestamp is down to the second, then multiple messages (including replays) could be sent in that second. The nonce may require some level of persistence, since it only works if uniqueness is guaranteed and checked.

Figure 3:
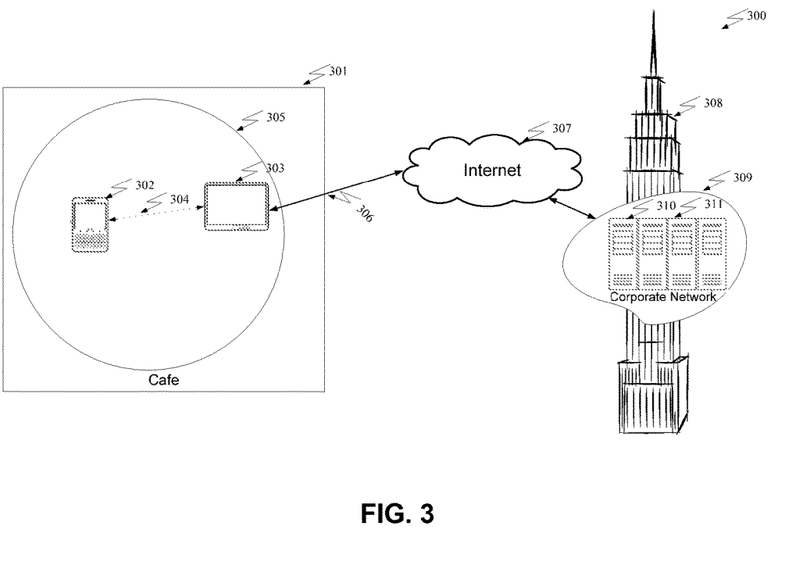
FIG. 3 is a network diagram illustrating communication flows between first and second peer devices and a corporate network.

FIG. 3 is a network diagram illustrating communication flows between first and second peer devices and a corporate network. FIG. 3 shows an exemplary scenario 300 where a user is in a cafe 301. The user has a first device 302 (e.g. a RIM Blackberry) where the application is installed and running. The user also has a second device 303 (e.g. an Apple iPad). The P2P connection between the first device (RIM BlackBerry) 302 and the second device (iPad) 303 is depicted by dashed line 304. The Bluetooth network range is shown by the circle 305. It will be appreciated that the method may also be among multiple users, each having their own devices, as long as paired sets of devices are within the prescribed distance of each other.

Using P2P or WiFi or other networking technology connection 306 the second device (iPad) 303 is able to connect to the internet 307 and establish a connection at the corporate headquarters 308 with the corporate network 309.

The corporate headquarters 308 houses the corporate network 309 (e.g. enterprise server) where enterprise resources like e-mail server 310 and file server 311 and other such resources and policies management servers may be located. Alternatively these enterprise resources may be hosted at third party hosting facilities.

Therefore whenever the first device (RIM Blackberry) 302 goes outside of the Bluetooth network range 305 the second device (iPad) 303 gets locked or its enterprise privileges are suspended or both.

In an alternate embodiment, the location of the user vis-a-vis the first and second devices may also play a role in determining the time-out window (i.e. how soon after losing connection with the first device the second device must lock itself up). Therefore as an example, if the user is in the office the time-out window may be larger since it is a trusted environment, but when in a public place like a cafe this time-out window may be shorter because it is not a trusted environment and it is desirable to reduce the possibility of any unauthorized use. This time-out window can be set by default or may be user-configurable.

In yet another alternate or complimentary embodiment, even within the same corporate office or building, the user's location may have a bearing on the time-out window. Additionally, the altimeter in a mobile device may also be used in determining if the user is on a floor which may be considered outside of the safe zone. In such a case, the time-out window may be reduced perhaps to the same level as a public place. For example, a user whose office is on the tenth floor may be considered to be in a safe zone on the tenth floor. When the user attends a meeting on the thirtieth floor, the thirtieth floor conference room may be considered a public place; and the time-out window rules for the user's device may apply accordingly.

It should be understood that although the term application has been used as an example in this disclosure but in essence the term may also imply to any other piece of software code where the embodiments of the invention are incorporated. The software application can be implemented in a stand-alone configuration or in combination with other software programs and is not limited to any particular operating system or programming paradigm described here. Thus, this invention intends to cover all applications and user interactions described above as well as those obvious to persons skilled in the art.

The computer program comprises: a computer usable medium having computer usable program code, the computer usable program code comprises: computer usable program code for presenting graphically to the users options for a touch-screen interface.

Several exemplary embodiments/implementations of the invention have been included in this disclosure. There may be other methods obvious to persons skilled in the art, and the intent is to cover all such scenarios. The application is not limited to the cited examples, but the intent is to cover all such areas that may be benefit from this invention.

The device may include but not limited to a personal computer (PC), which may include but not limited to a home PC, corporate PC, a Server, a laptop, a Netbook, a Mac, a cellular phone, a Smartphone, a PDA, an iPhone, an iPad, an iPod, an iPad, a PVR, a settop box, wireless enabled Blu-ray player, a TV, a SmartTV, wireless enabled Internet radio, e-book readers e.g. Kindle or Kindle DX, Nook, etc. and other such devices that may be used for the viewing and consumption of content whether the content is local, is generated on demand, is downloaded from a remote server where is exists already or is generated as a result. The first device and the second device may be running any number of different operating systems as diverse as Microsoft Windows family, MacOS, iOS, any variation of Google Android, any variation of Linux or Unix, PalmOS, Symbian OS, Ubuntu or such operating systems used for such devices available in the market today or that will become available as a result of the advancements made in such industries.

The intent of the application is to cover all such combinations and permutations not listed here but that are obvious to persons skilled in the art. The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

What is claimed is:

1. A method for permitting access to enterprise resources mediated between a first peer device and a second peer device, the method comprising:
   initiating a shared detection application on each of a first peer device and a second peer device;
   exchanging a security protocol between the first peer device and the second peer device;
   after the exchanging of the security protocol and based on a request by the second peer device to remotely access an enterprise network for an enterprise, detecting, by the shared detection application running on the first peer device, the second peer device is within a preset distance of the first peer device;
   based on the shared detection application of the first peer device detecting the second peer device being within a preset distance of the first peer device and the exchange of the security protocol, using the first peer device to permit the second peer device to access the enterprise network;
   while the second peer device is permitted access to the enterprise network, performing each of (i) monitoring, by the shared detection application, that the second peer device is within a preset distance of the first peer device; (ii) periodically sending a nonce by the second peer device to the first peer device; (iii) receiving, by the second peer device, a hash value of the nonce and a shared password from the first peer device; and
   based on detecting either (i) the second peer device is no longer within the preset distance of the first peer device, or (ii) the received hashed value does not match the hash value of the nonce and the shared password generated by the second peer device,
   shutting down access to the enterprise network by the second peer device.

2. The method of claim 1, further comprising:
   discovering, on the first peer device, one or more nearby devices through the shared detection application that executes on each of the first peer device and the second peer device, the one or more nearby devices including the second peer device.

3. The method of claim 2, wherein the discovering the one or more nearby devices includes using a wireless network selected from the group consisting of: Bluetooth, NFC, and WiFi.

4. The method of claim 2, further comprising displaying a list or menu of the one or more nearby devices on the first peer device, using the shared detection application.

5. The method of claim 4, wherein each of the nearby devices is displayed with a unique identifier.

6. The method of claim 1, further comprising:
wherein while the access is permitted, accessing an enterprise resource from the second peer device directly from an enterprise server without passing through the first peer device.

7. The method of claim 6, wherein the first peer device is unaware of the second peer device communicating with the enterprise server.

8. The method of claim 1, wherein based on detecting that the second peer device is no longer within the preset distance of the first peer device, shutting down access to the enterprise network by the second peer device after a pre-determined time following the detection.

9. The method of claim 8, further comprising:
detecting a location of the second peer device based on at least one location sensor in communication with the second peer device; or a user input received on the second peer device.

10. The method of claim 9, wherein the location sensor comprises a GPS receiver or a network receiver.

11. The method of claim 8, wherein detecting a location of the second peer device includes detecting that the location of the second peer device is in a public or unsecure place, and then shortening a length of the pre-determined time as compared to when the second peer device is determined to be in a private or secure place.

12. The method of claim 8, wherein detecting the location of the second peer device includes detecting that a location of the second peer device is in an office or place of business, and determining the length of the pre-determined time based on the determination.

13. The method of claim 1, wherein at least one of the first peer device or the second peer device is a mobile device.

14. The method of claim 8, further comprising:
determining information about a location of the second peer device relative to the first peer device; and
determining a length of the pre-determined time in response to the determined information about the location.

15. The method of claim 14, wherein determining information about the location of the second peer device includes determining information from an altimeter of the second peer device.

16. The method of claim 15, wherein the information includes determining when the second peer device is on a same floor of a building as the first peer device.

17. The method of claim 16, wherein determining information about the location of the second peer device includes determining information from a Global Positioning System unit of the second peer device.

18. The method of claim 1, further comprising:
detecting the second peer device using a communication exchange between the first peer device and the second peer device using the shared detection application.

19. The method of claim 18, wherein the shared detection application, when installed on each of the first peer device and the second peer device, enables communications using embedded P2P resources of each of the respective first and second peer devices.

* * * * *